(12) United States Patent
Popokh et al.

(10) Patent No.: US 11,854,061 B2
(45) Date of Patent: Dec. 26, 2023

(54) SERVICE PROVISIONING

(71) Applicant: Hewlett Packard Enterprise Development LP, Houston, TX (US)

(72) Inventors: Leonid Isaevich Popokh, Plano, TX (US); Earl Anthony D'Cunha, Calgary (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 403 days.

(21) Appl. No.: 15/119,067

(22) PCT Filed: Apr. 29, 2014

(86) PCT No.: PCT/US2014/035814
§ 371 (c)(1),
(2) Date: Aug. 15, 2016

(87) PCT Pub. No.: WO2015/167450
PCT Pub. Date: Nov. 5, 2015

(65) Prior Publication Data
US 2017/0053342 A1 Feb. 23, 2017

(51) Int. Cl.
*G06Q 10/00* (2023.01)
*G06Q 30/0601* (2023.01)
(Continued)

(52) U.S. Cl.
CPC ... *G06Q 30/0635* (2013.01); *G06Q 10/06316* (2013.01); *G06Q 10/103* (2013.01);
(Continued)

(58) Field of Classification Search
CPC ......... G06Q 10/06316; G06Q 30/0621; G06Q 10/103; G06Q 30/0635
See application file for complete search history.

(56) References Cited

U.S. PATENT DOCUMENTS 6,961,417 B2 * 11/2005 Koch ................ H04M 3/42153
379/207.02
8,478,616 B2 7/2013 De Klerk
(Continued)

FOREIGN PATENT DOCUMENTS

| EP | 2538638 A1 | 12/2012 |
|---|---|---|
| KR | 100758792 B1 | 9/2007 |
| WO | WO-9523482 A1 | 8/1995 |

OTHER PUBLICATIONS

Rainmaker: What You Can and Can't Do with Entitlement Management Through Salesforce, https://rainmakercloud.com/blog/2022/03/24/what-you-can-and-cant-do-with-entitlement-management-through salesforce (Year: 2022).*
(Continued)

*Primary Examiner* — Hafiz A Kassim
*Assistant Examiner* — Scott M Ross
(74) *Attorney, Agent, or Firm* — Trop, Pruner & Hu, P.C.

(57) ABSTRACT

In response to an order for a service from a customer, information pertaining to a service state change from a current service state to a new service state of the order is determined, where the current service state relates to a current service provided to the customer. In response to the information pertaining to the service state change, a network element of an infrastructure of network elements to provision is identified.

17 Claims, 3 Drawing Sheets

(51) Int. Cl.
  *G06Q 50/10* (2012.01)
  *G06Q 50/32* (2012.01)
  *G06Q 10/10* (2023.01)
  *H04L 67/51* (2022.01)
  *G06Q 10/0631* (2023.01)

(52) U.S. Cl.
  CPC ......... *G06Q 30/0621* (2013.01); *G06Q 50/10* (2013.01); *G06Q 50/32* (2013.01); *H04L 67/51* (2022.05)

(56) References Cited

U.S. PATENT DOCUMENTS

| | | | | |
|---|---|---|---|---|
| 8,645,002 B2* | 2/2014 | Gray | .................... | G06Q 20/102 455/419 |
| 2004/0210450 A1* | 10/2004 | Atencio | .................. | H04L 41/18 705/30 |
| 2006/0159106 A1* | 7/2006 | Slyke | .................. | H04L 12/5601 370/395.21 |
| 2007/0150480 A1 | 6/2007 | Hwang et al. | | |
| 2007/0177555 A1* | 8/2007 | Brueck | ................ | H04L 12/189 370/338 |
| 2008/0117869 A1* | 5/2008 | Freen | .................... | H04W 28/16 370/329 |
| 2009/0240760 A1* | 9/2009 | McDougle | ............ | H04L 63/045 709/201 |
| 2010/0312612 A1 | 12/2010 | Carr et al. | | |
| 2011/0004549 A1* | 1/2011 | Gray | .................... | G06F 21/572 709/224 |
| 2014/0012627 A1 | 1/2014 | Swanson | | |
| 2014/0012856 A1* | 1/2014 | Abdelrahman | ...... | G06Q 10/087 707/740 |
| 2014/0108187 A1* | 4/2014 | Kangovi | ................ | G06Q 30/02 705/26.5 |
| 2018/0330621 A1* | 11/2018 | Kuncl | ................... | G08G 1/205 |

OTHER PUBLICATIONS

Provision security for cloud-scale analytics in Azure, Microsoft, Sep. 14, 2022 (Year: 2022).*
Cheng'en, Duan, "Building a subscriber-centric mobile network" Huawei Communicate, Issue 56, Jun. 2012 (3 pages).
Hewlett-Packard Development Company, "HP Service Activator 5.0 a product brief from HP" HP Service Activator, Jan. 2008 (4 pages).
Hewlett-Packard Development Company, "HP Service Activator 6.0 Software Data Sheet" HP Service Activator, Dec. 2011 (8 pages).
Hewlett-Packard Development Company, "HP Service Activator solution for Managed Services (HPSA-MSS)" HP Service Activator, Jan. 2008 (2 pages).
International Searching Authority, "Notification of Transmittal of the International Search report and the Written Opinion", PCT/US2014/035814, dated Apr. 29, 2014 12 pages.
Nicholson, et al., "Subscriber-Centric Fulfillment: How a Customer-focused Back Office Shapes the User Experience" Pipeline, vol. 3, Issue 5, Oct. 2006 (3 pages).
Sigma-Systems, "Service Management Platform (SMP)" Sigma Data Sheet, 2013 (4 pages).

* cited by examiner

SERVICE PROVISIONING

BACKGROUND

A service provider can maintain an infrastructure that enables delivery of services to customers of the service provider. For example, the service provider can be a provider of various communication services, including television services, video streaming services, music streaming services, voice services, and data services. Customers of the service provider can subscribe to specific services offered by the service provider. Different customers can subscribe to different combinations of services.

BRIEF DESCRIPTION OF THE DRAWINGS

Some example implementations are described with respect to the following figures.

DETAILED DESCRIPTION

Figure 1:
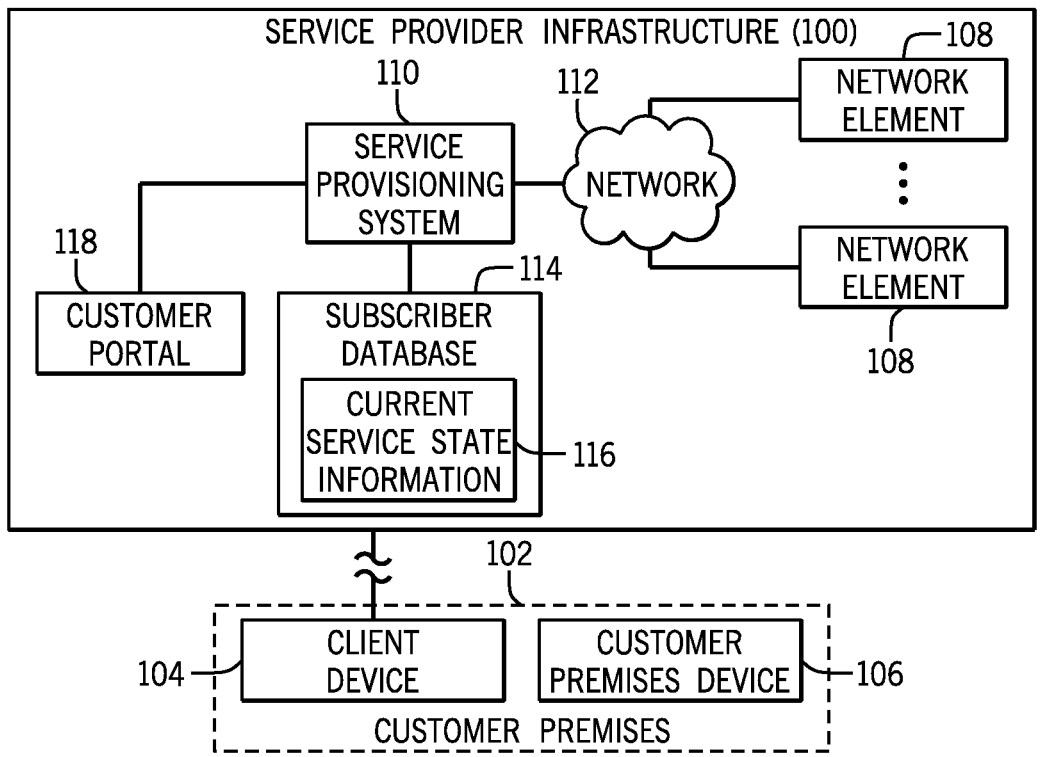
FIG. 1 is a block diagram of an example arrangement including a service provider infrastructure and equipment at customer premises, in accordance with some implementations.

A service provider infrastructure of a service provider can include various network elements that are configurable to deliver selected services to customers of the service provider. A customer of a service provider can refer to an individual or an enterprise (e.g. business concern, educational organization, or government agency).

Examples of network elements include any or some combination of the following: a data communication server (e.g. an Internet server, an email server, text messaging server, etc.) useable by a customer to perform data communications (e.g. web browsing, email communications, text messaging, etc.) over a network, such as the Internet, a wireless network, or other type of network; a video streaming server to deliver streaming video to a customer, such as streaming video associated with a television program, a movie, a sporting event, and so forth; a music streaming server to deliver streaming music to a customer an application server to allow a customer to access an application, such as an application relating to user access of customer premises equipment over a network; a voice call server to allow a customer to make a voice call; and other network elements.

For each given type of network element, the service provider infrastructure may include multiple different models of the given type of network element, where the models can be from different manufacturers or have different versions of hardware and/or machine-readable instructions (e.g. software and/or firmware). As examples, different models of the given type of network element can be used in different regional markets of the service provider.

In some examples, provisioning workflows can be predefined to provide services to customers. Each provisioning workflow includes tasks relating to provisioning of network elements to enable delivery of a respective service or set of services. Provisioning a network element includes configuring a resource of the network element to make the resource available to a customer.

The provisioning workflow used can depend on various factors, including a service to be activated, a type of customer premises device (the device at customer premises used to deliver a service to the customer), a corresponding scenario, and models of network elements that are to be provisioned to activate the service. In other words, different provisioning workflows can be employed for different combinations of services, types of customer premises devices, scenarios, and network element models. Examples of customer premises devices can include set-top boxes, modems, computers, game appliances, mobile devices, or other devices.

A scenario can refer to the type of service provisioning that is to be performed. For example, a first scenario involves adding (initially activating) a service. A second scenario can involve modifying a service. A third scenario can involve de-activating a service.

As a service provider innovates and reacts to market conditions, there can be continual change in customer premises devices, scenarios and/or network element models employed by the service provider. In response to such change, the service provider can provide new provisioning workflows. However, having to continually generate new provisioning workflows in response to changes of the service provider can result in added burden to the service provider.

In accordance with some implementations, a service provisioning system employs a data-driven provisioning technique instead of a workflow-based provisioning technique to enable delivery of a service to a customer. In a data-driven provisioning technique, predefined provisioning workflows do not have to be generated. Instead, the service provisioning system is able to dynamically identify actions to take in response to an order for a service (or set of services) received from a customer. The identified actions are based on the difference (or delta) between a current service state of the customer (as maintained in a subscriber database) and a new service state that corresponds to the order from the customer.

The subscriber database maintains information relating to a service (or multiple services) that is currently subscribed to by each respective customer. For example, the information can relate to a specific service (or services) of the customer, such as information relating to which one or multiple of the following services is subscribed to by the customer a television service, a video streaming service, a music streaming service, a voice service, and a data service.

FIG. 1 is a block diagram of an example arrangement that includes a service provider infrastructure 100 and devices located at a customer premises 102. The customer premises 102 can be the home of a customer, an office location, or any other location associated with a customer to which a service of the service provider infrastructure 100 can be delivered to the customer. In the example of FIG. 1, a client device 104 and a customer premises device 106 are located at the customer premises 102. The client device 104 can be a notebook computer, a desktop computer, a tablet computer, a smartphone, a personal digital assistant, a game appliance, or any other device that is usable by the customer to access the service provider infrastructure 100 over a network. The customer premises device 106 is a device that is used for delivering a service (or multiple services) to the customer at the customer premises 102. Examples of the customer premises device 106 can include a set-top box, a modem, a computer, a game appliance, mobile devices, or another device.

Although the client device 104 and the customer premises device 106 are shown as separate devices in the example of FIG. 1, it is noted that the client device 104 and the customer premises device 106 can be combined into one device in other examples. Also in other examples, multiple customer premises 102 associated with respective different customers can be provided.

The service provider infrastructure 100 includes various network elements 108 that are provisionable by a service provisioning system 110 to deliver a service (or services) to a customer at the customer premises device 106.

Examples of the network elements 108 include a data communication server, a voice server, a video streaming server, a music streaming server, an application server, or any other network element that participates in delivering at least one aspect of a service to a customer.

The network elements 108 are coupled over a network 112 to the service provisioning system 110. Although just one service provisioning system 110 is shown in FIG. 1, it is noted that in other examples, multiple service provisioning systems 110 can be provided in the service provider infrastructure 100. Although not shown, the service provider infrastructure 100 in some examples may include a network element management system that the service provisioning system 110 uses to provision a cluster of network elements.

The service provider infrastructure 100 can be located at a single geographic location, or alternatively, the service provider infrastructure 100 can be distributed across multiple geographic locations, such as locations of different regional markets.

The service provisioning system 110 is coupled to a subscriber database 114, which maintains current state information for each of the customers of the service provider. Note that the current state information maintained by the subscriber database 114 can include information that is specific to services and devices for delivering the services. The subscriber database 114 may also hold information for billing purposes and address information of customers; however, the subscriber database 114 in some examples does not hold other information identifying customers.

In addition, the service provider infrastructure 100 includes a customer portal 118, which is accessible by the client device 104 and/or customer premises device 106 to allow a user to access the service provider infrastructure 100, such as to order a service. In some examples, the customer portal 118 can be a website that is accessible over a network by the client device 104 and/or customer premises device 106. In other examples, the customer portal 118 can be any other type of portal accessible by a customer, such as a video-on-demand portal, a pay-per-view portal, and so forth.

Current service state information 116 maintained for the service (or services) of a customer can include various technical attributes and entitlement information associated with the service(s). Entitlement information specifies whether a customer is entitled (allowed) to access a specific feature provided by a service provider (examples of entitlement information are provided below. More generally, technical attributes and entitlement information can be referred to as "attributes." Examples of attributes can include any or some combination of the following: type of service; data communication speed attribute (e.g. maximum data communication speed for data communications); quality-of-service (QOS) attribute, which identifies a level of service to be delivered to the customer (e.g. the customer can subscribe to a gold service, a silver service, or a bronze service, where the different gold, silver, and bronze levels can correspond to different service qualities, such as resolution of video delivered, maximum achievable speed for data communications, etc.); an attribute regarding whether international calls are included with a voice service; an attribute relating to whether the voice service is to be deployed over the Internet (e.g. for voice-over Internet Protocol calls or over a traditional circuit-switched voice network); a number of voicemails that can be held before a mailbox is marked full; pay-per-view entitlement information to indicate whether a customer can order a pay-per-view item (e.g. movie, sporting event, etc.); WiFi entitlement information to specify whether a wired Internet customer is also entitled to use the service provider's public WiFi access points; "one-number" entitlement information specifying whether a customer is able to use a mobile device as an extension of the customer's home phone service (e.g. the mobile device is tied to the same home phone number); and so forth.

Figure 2:
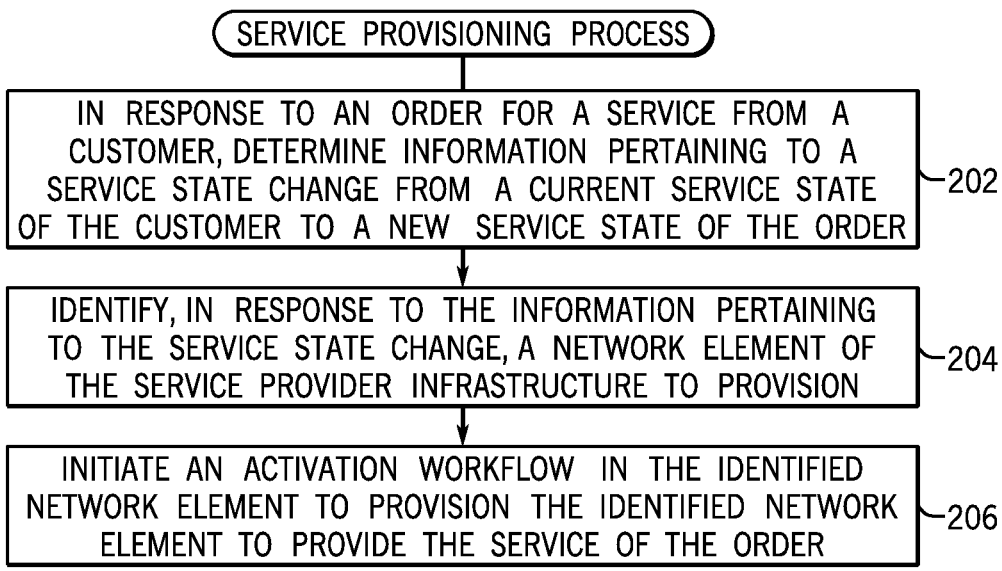
FIG. 2 is a flow diagram of an example service provisioning process according to some implementations.

FIG. 2 is a flow diagram of a service provisioning process, which can be performed by the service provisioning system 110 of FIG. 1, for example. In response to an order for a service from a customer, the service provisioning system 110 determines (at 202) information pertaining to a service state change from a current service state to a new service state of the order, where the current service state relates to a current service provided to the customer. The current service state can include information retrieved from the subscriber database 114 for the customer who submitted the order. The order can be submitted by the customer through the customer portal 118 of FIG. 1, for example. The customer can access the customer portal 118 at the client device 104 and/or at the customer premises device 106. For example, if the customer portal 118 is a website, then a web browser at the client device 104 and/or the customer premises device 106 can be used to access the website. The website can present various web pages to the customer, and the web pages can include various elements selectable by the customer, various fields in which the customer can enter text, and a menu of selectable items from which the customer can make a selection to order a service.

The order submitted by the customer through the customer portal 118 can specify an addition of a new service, a modification of an existing service, or a de-activation of an existing service.

The new service state of the order can be a service state determined based upon the service ordered by the customer. For example, the customer may order a voice service, in which case the new service state can include various technical attributes and entitlement information (collectively referred to as "attributes") relating to the voice service, such as a technical attribute regarding whether international calls are included with the voice service, a technical attribute relating to whether the voice service is to be deployed over the Internet, and other applicable attributes.

The information pertaining to a service state change can be based on the comparison of the current service state and the new service state (comparison of attributes of the current service state and the new service state). A difference between the current service state and the new service state indicates the change that is to be implemented in response to the order from the customer. The difference between the current service state and the new service state can include those attributes that differ. For example, the customer may be currently subscribed to a data communication service of the service provider. The order submitted by the customer can specify addition of a voice service. As a result, the service state change is the difference between the current service state (which includes attributes of just the data communication service) and the new service state of the customer (which includes attributes of the voice service). Therefore, the information pertaining to the service state change can include attributes relating to the voice service in this example. The information pertaining to the service state change can be referred to as a "delta order."

In response to the information pertaining to the service state change, the service provisioning system 110 identifies (at 204) a network element of the service provider infrastructure 100 to provision to implement the service state change. The service provisioning system 110 next initiates (at 206) an activation workflow in the identified network element, to provision the identified network element to provide the service specified by the order. For example, initiating the activation workflow in the identified network element can include sending an activation command, or a sequence of activation commands, to the identified network element. For example, to activate a voice service, a resource of a voice call server (one of the network elements 108 in the service provider infrastructure 100) can be configured to be accessible by the customer premises device 106 of the customer, such that the customer can use the voice call server to make or receive a voice call.

For other types of services, corresponding resources of network elements 108 can be configured in response to activation commands to allow for access of such resources by the customer premises device 106 to perform the respective services. Note that an activation command can also be used to configure a resource of a network element such that the resource is no longer accessible by the customer premises device 106 of the customer, such as in examples where the order from the customer specifies de-activation of a service.

In the discussion of FIG. 2, reference is made to an order for a service. It is contemplated that "an order for a service" can include an order for one or multiple services, or one or multiple orders for one or multiple services. Also, in FIG. 2, a current service state can relate to a current service or multiple services provided to the customer.

In addition, reference in FIG. 2 to identifying (at 204) a network element to provision can include identifying one or multiple network elements to provision. Also, in task 206, initiating an activation workflow in the identified network element can refer to initiating an activation workflow in the identified one or multiple network elements.

Figure 3:
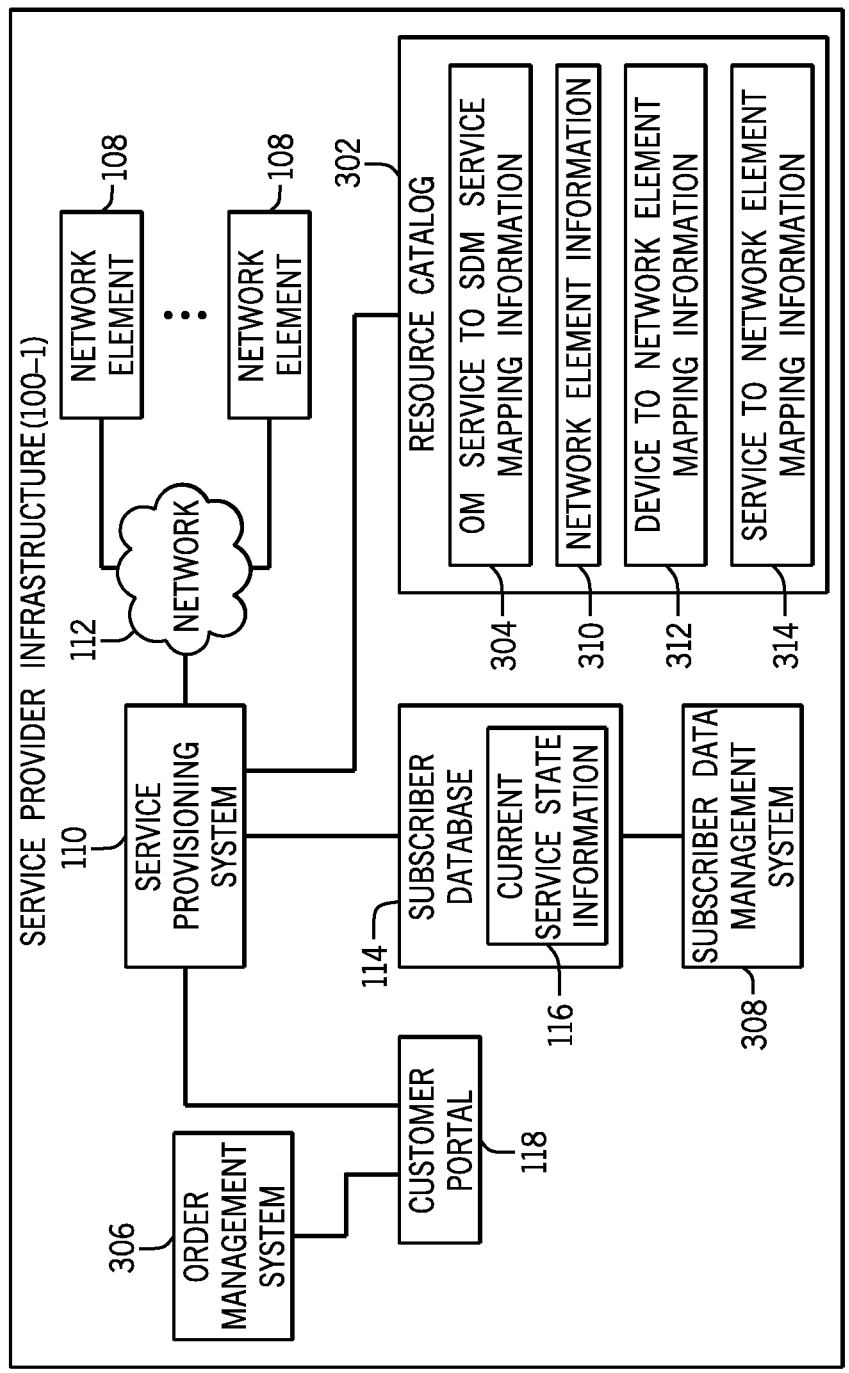
FIG. 3 is a block diagram of an example service provider infrastructure according to further implementations.

FIG. 3 is a block diagram of an example service provider infrastructure 100-1 according to further implementations. Elements of the service provider infrastructure 100-1 that are the same as or similar to corresponding elements in the service provider infrastructure 100 of FIG. 1 are referenced with the same reference numerals. In FIG. 3, in addition to the elements depicted in FIG. 1, the service provider infrastructure 100-1 further includes a resource catalog 302 that can be used by the service provisioning system 110 to perform various tasks, as discussed further below.

In some examples, the resource catalog 302 includes mapping information 304 to map between an order management (OM) service and a subscriber data management (SDM) service. An OM service refers to a service defined by an order management system 306 of the service provider infrastructure 100-1. The order management system 306 provides descriptions of various services that are offered to customers, which are viewable by the customers at a device of the customer (e.g. client device 104 and/or customer premises device 106 in FIG. 1). The OM services of the order management system 306, which are viewable through the customer portal 118, are provided as higher level service descriptions. For example, the higher level service descriptions can provide descriptions of various services that can be understood by a customer. Moreover, the higher level service descriptions can also indicate specific options available for each of the services, such as download and upload speeds of data communications, different television packages selectable by a customer, different voice call plans selectable by a customer, and so forth.

An SDM service refers to a service as defined by a subscriber data management system 308. The subscriber data management system 308 can describe a service in terms of various attributes (including technical attributes and entitlement information) for each service, such as attributes discussed further above.

When an order is received through the customer portal 118 that specifies an OM service, the service provisioning system 110 can use the mapping information 304 to map the OM service of the order to a respective SDM service. Mapping the OM service to the SDM service allows for a comparison of the SDM service associated with the order with the current service state information (e.g. 116) maintained in the subscriber database 114 for the customer that submitted the order.

The mapping information 304 can include a list of OM services, a list of SDM services, and the mapping between the OM services and the SDM services. The use of the mapping information 304 allows for isolation between the subscriber data management system 308 and the order management system 306, such that SDM services provided by the subscriber data management system 308 do not have to be changed in response to changes made to the OM services of the order management system 306. For example, marketing personnel of the service provider may decide to change the OM services that are visible to customers. Even though the OM services are changed, the corresponding SDM services of the subscriber data management system 308 do not have to be changed; rather, the mapping information 304 can be updated to reflect the changes in the OM services that are mapped to respective SDM services. In this way, OM services and the SDM services can be configured independently of each other.

The resource catalog 302 can also include network element information 310, which can include information pertaining to various network elements 108 of the service provider infrastructure 100-1. For example, the network element information 310 can identify different types of network elements, the models of each type of network element, and the different instances of network elements and connections of such network elements to other elements. An instance of a network element refers to an actual network element deployed in the service provider infrastructure 100-1.

The resource catalog 302 can also include mapping information 312 that maps between a customer premises device (e.g. 106 in FIG. 1) and a respective one or multiple network elements (e.g. 108). As discussed above, a customer premises device 106 is the device located at the customer premises 102 that is used to deliver a service to a customer. For a given type of customer premises device 106, there are certain corresponding network elements 108 that are to be used for delivering respective services to the customer premises device 106. The mapping information 312 maps each customer premises device to a respective one or multiple network elements. The mapping information 312 can further identify actions that are to be performed at each network element to configure a specific service to be delivered at the respective customer premises device.

The resource catalog 302 can also include mapping information 314 to map services to network elements. For a given service to be delivered to a customer, the mapping information 314 can identify the network element (or network elements) that are to be provisioned to deliver such service. The mapping information 314 can also identify the actions that are to be performed with respect to the network element(s) to provision such network element(s) for delivering the respective service. Note that the actions identified by the mapping information 314 are actions that are not related to actions that are not related to the customer premises device 106 used to deliver a specific service.

Although the various information 304, 310, 312, and 314 are depicted as being part of one data structure (e.g. the resource catalog 302), it is noted that the various information can be stored in multiple data structures in other examples.

Figure 4:
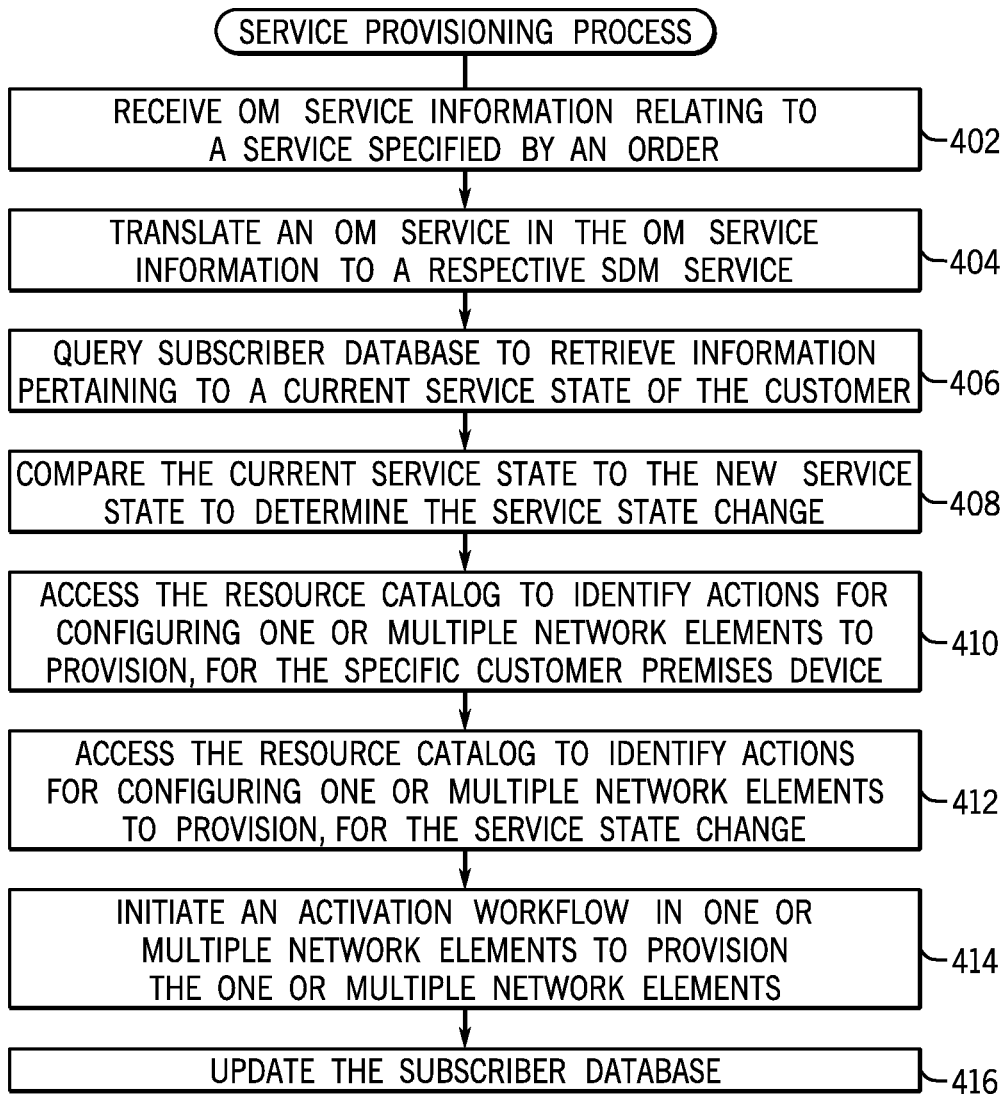
FIG. 4 is a flow diagram of an example service provisioning process according to further implementations.

FIG. 4 is a flow diagram of a service provisioning process according to further implementations, which can be performed by the service provisioning system 110 of FIG. 3, for example. The service provisioning system 110 receives (at 402), through the customer portal 118, OM service information relating to a service specified by an order. The service provisioning system 110 translates (at 404) an OM service in the OM service information to a respective SDM service. This translation can be performed using the mapping information 304 of the resource catalog 302, for example.

The service provisioning system 110 further queries (at 406) the subscriber database 114 to retrieve information pertaining to a current service state of the customer.

The service provisioning system 110 then compares (at 408) the current service state to the new service state of the order, to determine the service state change.

At this point, the service provisioning system 110 is aware of the service state change as well as the specific customer premises device that is to be used for delivering the service to the customer. The service provisioning system 110 can access (at 410) the mapping information 312 in the resource catalog 302 to identify actions to be performed for configuring one or multiple network elements to provision, for the specific customer premises device. The service provisioning system 110 also accesses (at 412) the mapping information 314 to determine actions to be performed for configuring one or multiple network elements, for the service state change.

Once the actions are identified at 410 and 412, the service provisioning system 110 initiates (at 414) an activation workflow in the identified one or multiple network elements to provision the identified one or multiple network elements.

Once the one or multiple network elements have been provisioned, the service provisioning system 110 can update (at 416) the subscriber database 114 to reflect the updated current service state of the customer.

By using the service provisioning system 110 according to some implementations, actions to take for provisioning one or multiple network elements to deliver a service (or services) of an order can be determined dynamically, without having to rely on predefined provisioning workflows that address different combinations of customer premises devices, scenarios, and network element models. As a result, a change in the service provider infrastructure 100 or 100-1 would not result in having to generate new predefined provisioning workflows.

Figure 5:
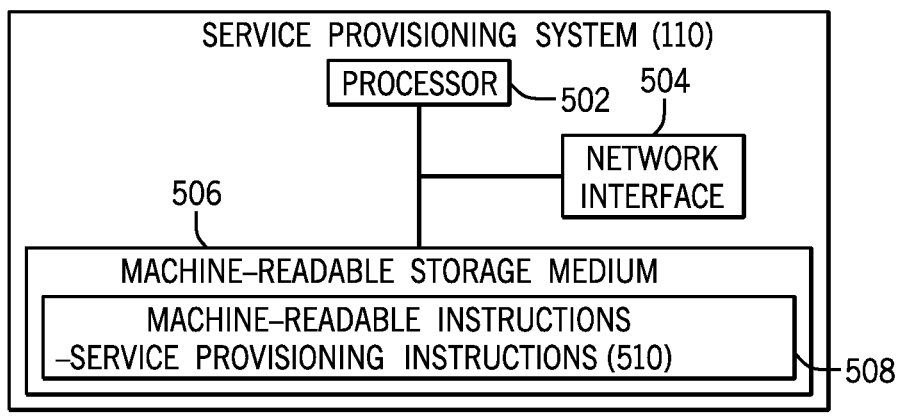
FIG. 5 is a block diagram of an example service provisioning system according to some implementations.

FIG. 5 is a block diagram of the service provisioning system 110, according to some examples. The service provisioning system 110 includes a processor (or multiple processors) 502, which can be coupled to a network interface 504 for communicating over a network. A processor can include a microprocessor, microcontroller, processor module or subsystem, programmable integrated circuit, programmable gate array, or another control or computing device. The processor(s) 502 can be coupled to a non-transitory machine-readable or computer-readable storage medium (or storage media) 506, which can store machine-readable instructions 508. The machine-readable instructions can include service provisioning instructions 510 that can be loaded for execution on the processor(s) 502 for performing various tasks, such as tasks according to FIGS. 2 and 4, as examples.

The storage medium (or storage media) 506 can be implemented with one or multiple forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method for dynamically identifying actions to take in response to an order for a service from a customer associated with a level of access to combinations of services, types of customer premises devices, scenarios, or network element models of a distributed infrastructure, the method comprising:

determining, by a system including a processor, a mapping of the distributed infrastructure with the level of access to the combinations of the services, the types of customer premises devices, the scenarios, or the network element models;

receiving the order for the service from the customer, wherein the order identifies a high level description of the level of access to the combinations of the services, the types of customer premises devices, the scenarios, or the network element models of the distributed infrastructure;

translating the high level description of the level of access to the combinations of the services, the types of customer premises devices, the scenarios, or the network element models of the distributed infrastructure identified in the order to a first set of technical attributes characterizing customer-level features of the service that set forth the customer's future level of access to the distributed infrastructure, wherein the translation utilizes the mapping of the distributed infrastructure to correlate the technical attributes with the future level of access to the distributed infrastructure;

determining a current service state of the customer by retrieving the current service state of the customer from a database containing service state information for customers, wherein the current service state of the customer pertains to a second set of technical attributes corresponding with the customer's current level of access to the distributed infrastructure;

determining a difference between the second set of technical attributes associated with the customer's current level of access to the distributed infrastructure in accordance with the current service state of the customer and the first set of technical attributes associated with the customer's future level of access to the distributed infrastructure;

characterizing the difference between the second set of technical attributes and the first set of technical attributes as a service state change from the current service state of the customer to a new service state of the customer;

initiating a dynamic change of the customer's access to the distributed infrastructure corresponding with the difference between the second set of technical attributes and the first set of technical attributes, the dynamic change including:
from the mapping of the distributed infrastructure, identifying, by the system, a network element of the distributed infrastructure that is operable to provide the access to the combinations of the services, the types of customer premises devices, the scenarios, or the network element models,
wherein the mapping of the distributed infrastructure further maps the customer premises devices to actions to perform on the identified network element; and
provisioning, by the system, the network element of the distributed infrastructure, wherein the provisioning includes configuring the network element of the distributed infrastructure to deliver the service state change to the customer.

2. The method of claim 1, wherein the mapping of the distributed infrastructure further maps the customer premises devices to network elements or actions based on a customer premises device of the customer.

3. The method of claim 1, further comprising: issuing an activation command to a network element to configure a resource of the network element.

4. The method of claim 1, wherein the current service state relates to multiple current services provided to the customer.

5. The method of claim 1, wherein the mapping of the distributed infrastructure with the level of access to the combinations of the services, the types of customer premises devices, the scenarios, or the network element models is stored in a list of order management (OM) services.

6. The method of claim 1, wherein the level of access corresponds with different resolution of video delivered.

7. The method of claim 1, wherein the level of access corresponds with a maximum achievable speed for data communications.

8. The method of claim 1, wherein the customer's current level of access to the distributed infrastructure corresponds with a data communication service and the customer's future level of access to the distributed infrastructure corresponds with a voice service.

9. The method of claim 1, wherein provisioning the network element of the distributed infrastructure comprises transmitting, by the system, a sequence of activation commands to the network element.

10. The method of claim 1, wherein provisioning the network element of the distributed infrastructure comprises transmitting, by the system, a de-activation command to the network element.

11. The method of claim 1, further comprising:
in response to provisioning the network element, update the database to reflect the service state change of the customer.

12. The method of claim 1, further comprising:
issuing an activation command to a network element, wherein the activation command initiates a configuration of a resource of a network element such that the resource is no longer accessible by a customer premises device of the customer.

13. An article for dynamically identifying actions to take in response to an order for a service from a customer associated with a level of access to combinations of services, types of customer premises devices, scenarios, or network element models of a distributed infrastructure, the article comprising at least one non-transitory machine-readable storage medium storing instructions that upon execution cause a system to:
determine a mapping of the distributed infrastructure with the level of access to the combinations of the services, the types of customer premises devices, the scenarios, or the network element models;
receive the order for the service from the customer, wherein the order identifies a high level description of the level of access to the combinations of the services, the types of customer premises devices, the scenarios, or the network element models of the distributed infrastructure;
translate the high level description of the level of access to the combinations of the services, the types of customer premises devices, the scenarios, or the network element models of the distributed infrastructure identified in the order to a first set of technical attributes characterizing customer-level features of the service that set forth the customer's future level of access to the distributed infrastructure, wherein the translation utilizes the mapping of the distributed infrastructure to correlate the technical attributes with the future level of access to the distributed infrastructure;
determine a current service state of the customer by retrieving the current service state of the customer from a database containing service state information for customers, wherein the current service state of the customer pertains to a second set of technical attributes corresponding with the customer's current level of access to the distributed infrastructure;
determine a difference between the second set of technical attributes associated with the customer's current level of access to the distributed infrastructure in accordance with the current service state of the customer and the first set of technical attributes associated with the customer's future level of access to the distributed infrastructure;

characterize the difference between the second set of technical attributes and the first set of technical attributes as a service state change from the current service state of the customer to a new service state of the customer;

initiate a dynamic change of the customer's access to the distributed infrastructure corresponding with the difference between the second set of technical attributes and the first set of technical attributes;

from the mapping of the distributed infrastructure, identify a network element of the distributed infrastructure that is operable to provide the access to the combinations of the services, the types of customer premises devices, the scenarios, or the network element models, wherein the mapping of the distributed infrastructure further maps the customer premises devices to actions to perform on the identified network element; and provision the network element of the distributed infrastructure, wherein the provisioning includes configuring the network element of the distributed infrastructure to deliver the service state change to the customer.

14. The article of claim 13, wherein the mapping of the distributed infrastructure further maps the customer premises devices to network elements or actions based on a customer premises device of the customer.

15. The article of claim 13, wherein the instructions upon execution cause the system to:

in response to provisioning the network element, update the database to reflect the service state change of the customer.

16. A service provisioning system for dynamically identifying actions to take in response to an order for a service from a customer associated with a level of access to combinations of services, types of customer premises devices, scenarios, or network element models of a distributed infrastructure, the service provisioning system comprising:

at least one processor to:

determine a mapping of the distributed infrastructure with the level of access to the combinations of the services, the types of customer premises devices, the scenarios, or the network element models;

receive the order for the service from the customer, wherein the order identifies a high level description of the level of access to the combinations of the services, the types of customer premises devices, the scenarios, or the network element models of the distributed infrastructure;

translate the high level description of the level of access to the combinations of the services, the types of customer premises devices, the scenarios, or the network element models of the distributed infrastructure identified in the order to a first set of technical attributes characterizing customer-level features of the service that set forth the customer's future level of access to the distributed infrastructure, wherein the translation utilizes the mapping of the distributed infrastructure to correlate the technical attributes with the future level of access to the distributed infrastructure;

determine a current service state of the customer by retrieving the current service state of the customer from a database containing service state information for customers, wherein the current service state of the customer pertains to a second set of technical attributes corresponding with the customer's current level of access to the distributed infrastructure;

determine a difference between the second set of technical attributes associated with the customer's current level of access to the distributed infrastructure in accordance with the current service state of the customer and the first set of technical attributes associated with the customer's future level of access to the distributed infrastructure;

characterize the difference between the second set of technical attributes and the first set of technical attributes as a service state change from the current service state of the customer to a new service state of the customer;

initiate a dynamic change of the customer's access to the distributed infrastructure corresponding with the difference between the second set of technical attributes and the first set of technical attributes;

from the mapping of the distributed infrastructure, identify a network element of the distributed infrastructure that is operable to provide the access to the combinations of the services, the types of customer premises devices, the scenarios, or the network element models, wherein the mapping of the distributed infrastructure further maps the customer premises devices to actions to perform on the identified network element; and provision the network element of the distributed infrastructure, wherein the provisioning includes configuring the network element of the distributed infrastructure to deliver the service state change to the customer.

17. The service provisioning system of claim 16, wherein the mapping of the distributed infrastructure further maps the customer premises devices to network elements or actions based on a customer premises device of the customer.

* * * * *